(Model.)
P. D. CONNEELY.
LID FOR POTS AND OTHER VESSELS.
No. 276,359. Patented Apr. 24, 1883.
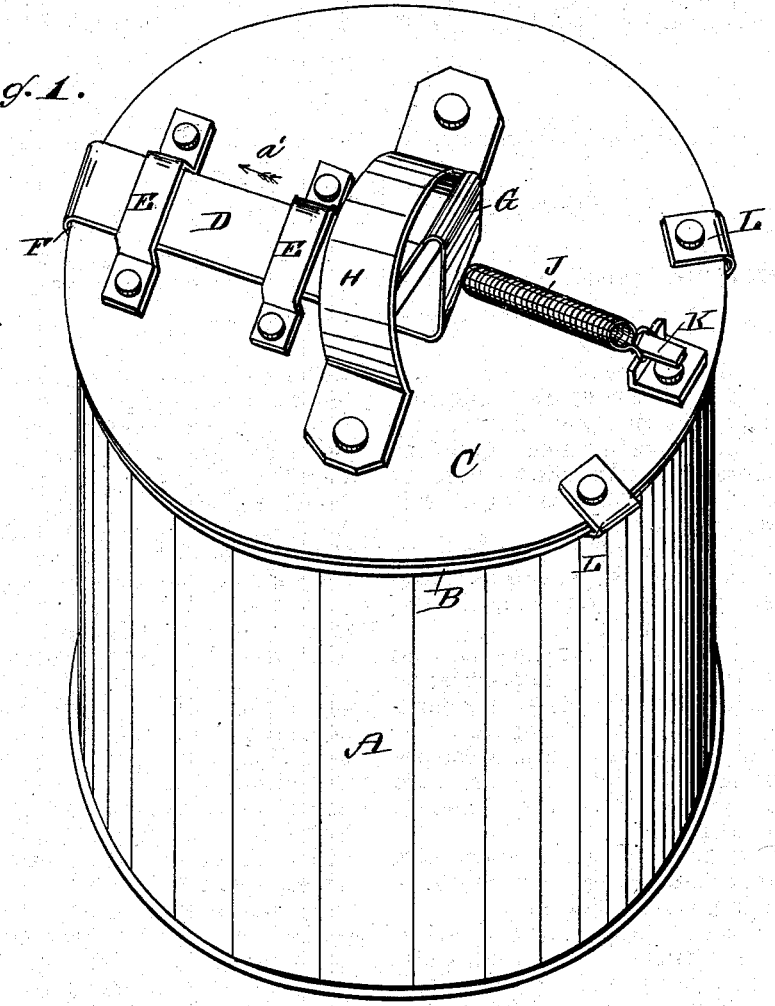
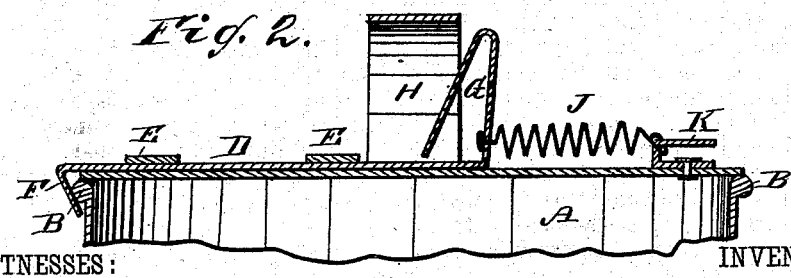
WITNESSES:  
Theo. G. Hoster  
C. Sedgwick
INVENTOR:  
P. D. Conneely  
BY Munn & Co  
ATTORNEYS.
N. PETERS, Photo-Lithographer, Washington, D. C.

UNITED STATES PATENT OFFICE.

PETER D. CONNEELY, OF HORSEHEADS, NEW YORK.

LID FOR POTS AND OTHER VESSELS.

SPECIFICATION forming part of Letters Patent No. 276,359, dated April 24, 1883.

Application filed February 14, 1883. (Model.)

*To all whom it may concern:*

Be it known that I, PETER D. CONNEELY, of Horseheads, in the county of Chemung and State of New York, have invented certain new and useful Improvements in Lids for Pots and other Vessels, of which the following is a full, clear, and exact description.

The object of my invention is to facilitate securing a lid on a pot, barrel, or other receptacle, and also to facilitate removing the said lid from the pot, barrel, &c.

Reference is to be had to the accompanying drawings, forming a part of this specification, in which similar letters of reference indicate corresponding parts in both the figures.

Figure 1 is a perspective view of a pot provided with my improved lid. Fig. 2 is a longitudinal sectional elevation of the lid and the upper part of the pot.

The pot A is provided at its upper edge with an annular bead, B, or with any other suitable ridge in place of the bead.

On the lid C a bolt, D, is held, to slide by clips E, suitably fastened on the lid, which bolt D is provided at one end with a hook, F, adapted to catch on the annular bead B or other ridge, and the opposite or inner end of the said bolt is turned upward to form a handle-piece, G, which is below or adjoining to the usual handle, H, provided on lids.

A spring, J, of some suitable construction, is attached to the inner end of the hook D and to an uphook-clip, K, fastened on the lid; or the spring J can be secured in any other suitable manner to the upper surface of the lid.

Opposite that part of the lid from which the hook F projects the lid is provided with two downhook-clips, L, adapted to catch on the annular bead or ridge B. The spring J draws on the inner end of the hook-bolt D, whereby the hook F will be pressed against the annular bead or ridge B.

The operation is as follows: If the lid is to be fastened on the pot, the bolt D is pressed in the direction of the arrow $a'$ by placing the thumb against the outer edge of the handle-piece G and holding the handle H, and then the lid is placed on the pot in such a manner that the hook-clips L will rest against the outer edge of the annular bead B. As soon as the bolt D is released the spring J will draw the hook-bolt D in the reverse direction of the arrow $a'$ and press the hook F against the annular bead B, thereby holding the lid on the pot. The pot can be tipped, inclined, or turned over without causing the cover to drop off, as the same will be held on the pot by the hook-clips L and the bolt D. If the cover is to be removed, the bolt D is pressed in the direction of the arrow $a'$, so as to remove the hook F from the bead B.

The above-described lid can also be used on barrels, buckets, butter-crocks, pans, and other like receptacles. It can be made of wood or metal, or of any other suitable material.

I am aware that it is not new to make a butter-pail cover with apertured opposite fastenings which spring over projecting catches on the body of the pail; but

What I claim as new and of my invention is—

The combination, with a cover, C, of the uphook-clip K, the downhook-clips L L, the spring J, the keepers E, and the plate D, the latter turned up at one end to form a handle, G, and down at the other to form a hook, F, whereby a cover may be locked to the edge bead of a vessel, as shown and described.

PETER D. CONNEELY.

Witnesses:
W. H. CHRISTIE,
R. A. VAN DUSEN.